(12) United States Patent
Bharucha

(10) Patent No.: US 12,447,900 B2
(45) Date of Patent: Oct. 21, 2025

(54) DUAL STAGE LADDER RACK FOR WORK VANS

(71) Applicant: ROM ACQUISITION CORPORATION, Belton, MO (US)

(72) Inventor: Rashid Bharucha, Roseville, MN (US)

( * ) Notice: Subject to any disclaimer, the term of this patent is extended or adjusted under 35 U.S.C. 154(b) by 148 days.

(21) Appl. No.: 18/128,753

(22) Filed: Mar. 30, 2023

(65) Prior Publication Data

US 2024/0326695 A1   Oct. 3, 2024

(51) Int. Cl.
*B60R 3/00*     (2006.01)
*B60R 3/02*     (2006.01)

(52) U.S. Cl.
CPC .............. B60R 3/005 (2013.01); B60R 3/02 (2013.01)

(58) Field of Classification Search
CPC ..... B60R 9/0485; B60R 9/0423; B60R 3/005; B60R 3/007; B60R 3/02
See application file for complete search history.

(56) References Cited

U.S. PATENT DOCUMENTS

| | | | |
|---|---|---|---|
| 5,927,912 A | 7/1999 | Michai et al. | |
| 6,092,972 A | 7/2000 | Levi | |
| 6,099,231 A | 8/2000 | Levi | |
| 6,427,889 B1 | 8/2002 | Levi | |
| 8,991,889 B1* | 3/2015 | Levi | B60R 9/0423 296/210 |
| 9,415,726 B2* | 8/2016 | Levi | B60R 9/0485 |
| 9,796,340 B2* | 10/2017 | Bharucha | B60R 9/0423 |
| 10,926,709 B2* | 2/2021 | Herriman | B60R 9/0423 |
| 2016/0023613 A1* | 1/2016 | Pullman | B60R 9/0423 414/800 |
| 2017/0240118 A1* | 8/2017 | Lachance | B60R 9/0423 |
| 2019/0248295 A1* | 8/2019 | Müller | B60R 9/0423 |

FOREIGN PATENT DOCUMENTS

| | | |
|---|---|---|
| CN | 101050687 A | 10/2007 |
| DE | 4403001 A1 | 8/1994 |
| EP | 2169175 A1 | 3/2010 |
| GB | 2305956 A | 4/1997 |
| JP | 200054616 A | 2/2000 |
| KR | 200412244 Y1 | 3/2006 |
| NL | 7614042 A | 6/1977 |
| WO | 9902915 A1 | 1/1999 |

* cited by examiner

*Primary Examiner* — Derek J Battisti
(74) *Attorney, Agent, or Firm* — Bradley J. Thorson

(57) ABSTRACT

A dual stage vehicle ladder rack permits multiple ladders to be stacked vertically above a vehicle for transport without requiring removal of the top ladder of the stack prior to removal of a lower ladder. A lower stage is movable, independent of an upper stage, between a loading/unloading position and a stowed position.

20 Claims, 8 Drawing Sheets

DUAL STAGE LADDER RACK FOR WORK VANS

CROSS REFERENCE TO RELATED APPLICATIONS

None

STATEMENT OF GOVERNMENT SPONSORSHIP

None

BACKGROUND OF THE INVENTION

I. Field of the Invention

This invention relates generally to ladder racks mountable on the roof of motor vehicles for transporting one or more extension ladders and/or step ladders to a work site, and more particularly to construction that alleviates the need for a worker to stack two such ladders directly on top of each other.

II. Discussion of the Prior Art

Work vehicles, such as commercial vans, often incorporate a roof rack adapted to support cargo of one type or another to be used at a work site. Such cargo often includes extension ladders and/or step ladders. Such ladders are often stacked, one directly on top of another. To avoid loss of the cargo during transport and possible serious injuries to other motorists who may be traveling behind the work vehicle, various means have been devised for securing such stacked ladders to the ladder rack. For example, some have used bungee cords and ropes to tie ladders in place on the vehicle-mounted roof rack, but this generally requires considerable effort, especially given the height and placement of the ladder rack on the van roof. This is also inconvenient when one wants to use the ladder on the bottom of the stack because one needs to remove all the ladders in the stack to use that particular ladder.

U.S. Pat. Nos. 5,297,912; 6,092,972; 6,099,231; and 6,427,889, the teachings of which are hereby incorporated by reference, described different designs of truck or van-mounted ladder racks that facilitate the loading and unloading of one or more ladders with respect to the vehicle's roof. These devices comprise front and rear four-bar linkage assemblies that include a stationary member which is adapted to rigidly affixed to the vehicle's roof or to cross-members that clamp to the vehicle's roof, and a ladder support member pivotally joined to the stationary member by a pair of transversely spaced links. A drive shaft is journaled for rotation in the stationary members of the front and rear four-bar linkage assemblies and is rigidly affixed to one of the pair of links of the front and rear four-bar linkage assemblies. Thus, when the drive shaft is rotated, either manually with a crank or automatically by means of a motor, ladders resting on the front and rear ladder support members are lifted and rotated from a position parallel to the vehicle's roof to a position parallel to the vehicle's side during an unloading maneuver. When reloading ladders onto the vehicle, the drive shaft is rotated in an opposite direction to raise and rotate the ladder load onto the vehicle's roof.

In these earlier designs described in the aforementioned patents, the four-bar linkages have been designed such that the top and foot of the ladders remain generally horizontal throughout their range of motion as the drive shaft is rotated.

While the earlier designs reflected in the above-listed patents greatly simplify the loading and unloading of ladders onto and from transport vehicles, they generally provide no way to arrange two ladders vertically on top of a vehicle roof, and certainly provide no way to arrange two ladders vertically on top of a vehicle roof stack in any way that permits the bottom ladder of the stack to be removed without first removing the upper ladder(s).

The present invention obviates this problem by allowing two ladders to be vertically arranged, one above the other, over a vehicle's roof in such a way that both may be removed without first removing the other.

While, after-the-fact, the present invention may appear simple, it solves a practical problem of allowing a worker to more readily remove or replace ladders from and onto a van mounted roof rack without strain.

SUMMARY OF THE INVENTION

In accordance with the present invention there is provided a roof top ladder rack for work vehicles including a pair of stage supports. Each of the stage supports has bottom portion adapted to be attached to the roof of a vehicle, a top portion, an inside portion and an outside portion. This pair of stage supports is used to support at least two vertically arranged stages above a vehicle's roof, more specifically an upper stage adapted to receive and hold at least one ladder coupled to the top portions of the two stage supports and a lower stage positioned between the roof of the vehicle and the upper stage. The lower stage is adapted to receive and hold another ladder.

In some embodiments the lower stage comprises a pivot bar coupled to the inside portions of the two stage supports below the upper stage and a latch bar coupled to the outside portions of the two stage supports below the upper stage. Rotatable mounted to the pivot bar are two lower stage support assemblies, each adapted to rotate about the pivot bar between a stowed position and a loading/unloading position.

Each stage support assembly including an angled support member having a shorter leg coupled to the pivot bar and a first longer leg adapted to support the second ladder. In some embodiments the shorter legs are perpendicular to the longer legs and the pivot bar extends through openings in the shorter legs.

A latch assembly adapted to selectively lock the lower stage support assembly in the stowed position. In some embodiments, the latch assembly comprises two latch sub-assemblies coupled to the two longer legs of the two angle support members of the two stage support assemblies. Each latch subassembly comprises a hook and a biasing spring. These hooks are adapted to move between a latched position and an unlatched position and engage the latch bar when the lower stage support assemblies are in the stowed position and the hooks are in the latched position. The biasing springs bias the hook toward the latched position. The latch assembly further comprises a latch actuator handle coupled to each of the hooks. The latch actuator handle is used to retract the hooks from the latched position to the unlatched position to disengage the hooks from the latch bar permitting the lower stage support assemblies to be rotated together about the pivot bar between the stowed position and the loading/unloading position.

The upper stage can be fixed in place. Various mechanisms may also be used to move ladders onto and off the upper stage. Once such mechanism included a first and a second 4-bar linkage assembly, each including a stationary bar member attached to the tops of the stage supports in parallel, spaced-apart relation so as to extend transverse to the longitudinal axis of said motor vehicle. Each 4-bar linkage also includes a movable bar member comprising a ladder rest pivotally coupled to the stationary bar member by a pair of rigid links of unequal length. This pair of rigid links is sized and positioned such that rotation of one of said pair of rigid links on each of the two 4-bar linkage assemblies results in the movable bar members comprising the ladder rests moving between a first disposition and a second disposition. The first disposition is generally parallel to the roof and vertically arranged above the lower stage. The second disposition is aligned with and spaced from one side of the vehicle. A connector rod of adjustable length extends longitudinally between the two 4-bar linkage assemblies. More specifically, the connector rod is journaled for rotation in the stationary bar member of each of said 4-bar linkage assemblies and operatively coupled to one of the pair of rigid links in each of said 4-bar linkage assemblies. A means for rotating said connecting rod is also provided. Rotation of the connecting rod actuates the two 4-bar linkage assemblies to move the ladder rest between the first and second disposition.

DESCRIPTION OF THE DRAWINGS

The foregoing features, objects and advantages of the invention will become apparent to those skilled in the art from the following detailed description of a preferred embodiment, especially when considered in conjunction of the accompanying drawings in which like numerals in the several views refer to corresponding parts.

DESCRIPTION OF THE PREFERRED EMBODIMENT

Figure 1:
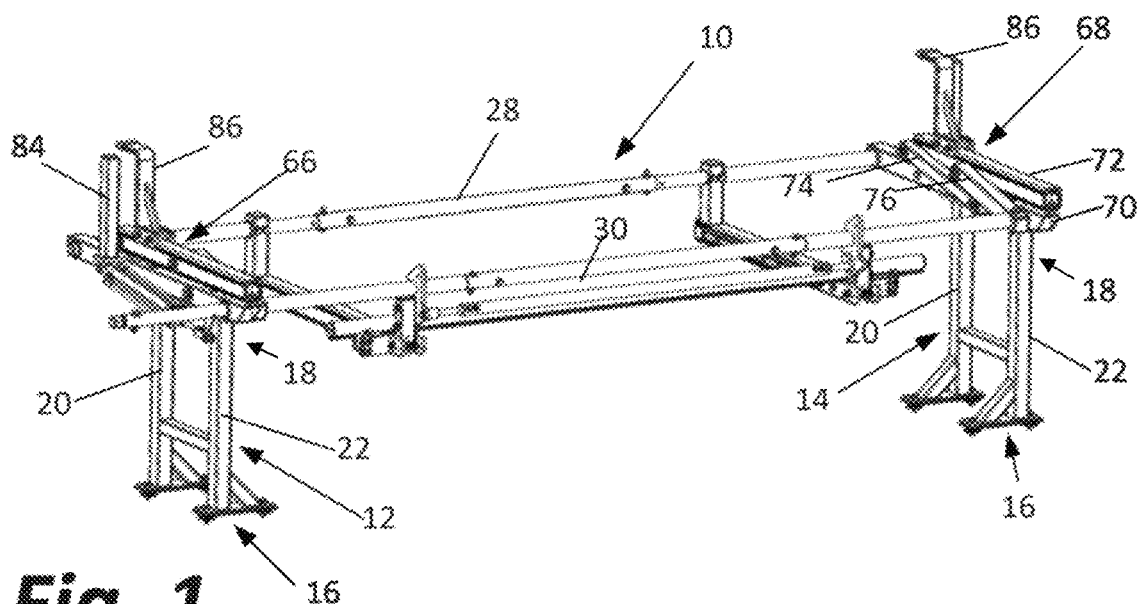
FIG. 1 is a perspective view of a ladder rack made in accordance with the present invention with an upper stage and a lower stage both in their stowed position.
Figure 2:
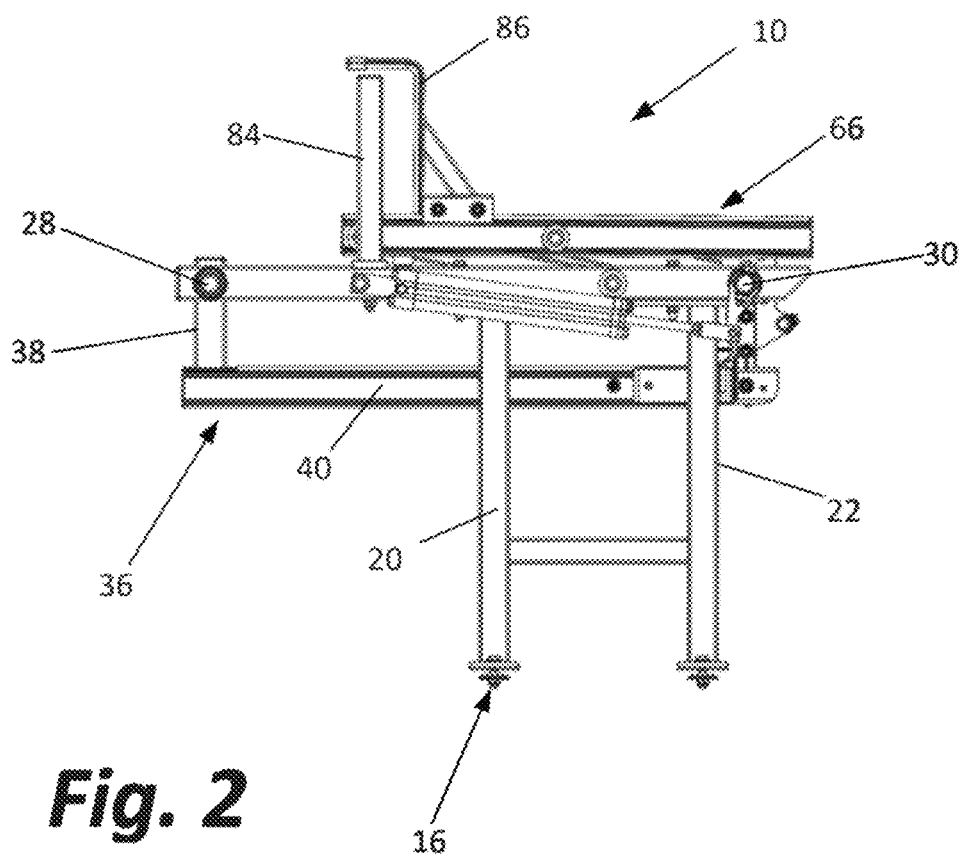
FIG. 2 is a side view of the ladder rack of FIG. 1 with the upper stage and the lower stage both in their stowed position.
Figure 3:
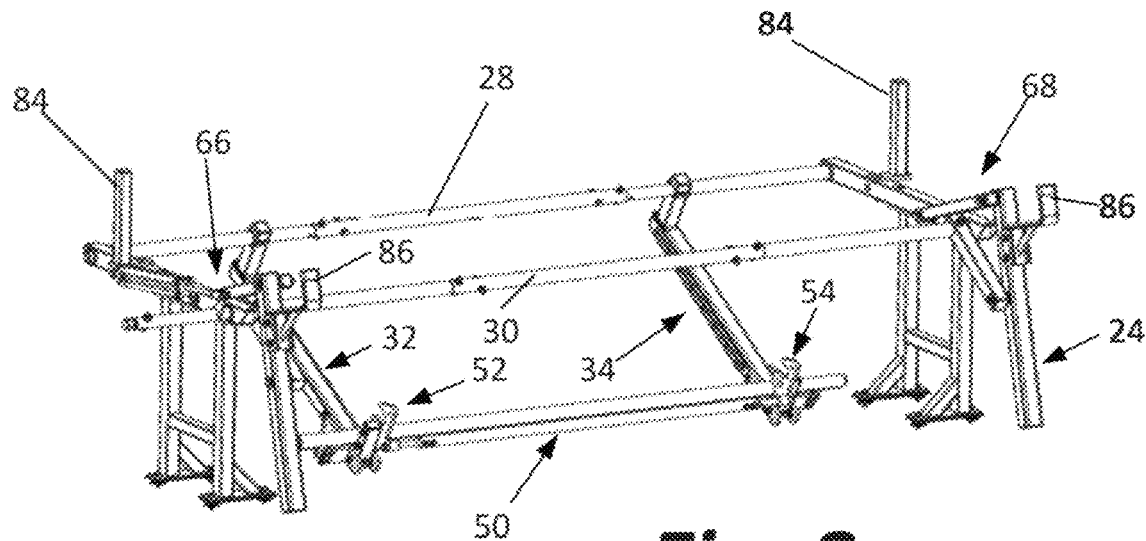
FIG. 3 is a perspective view of the ladder rack of FIG. 1 with the upper stage and the lower stage both in their loading/unloading position.
Figure 4:
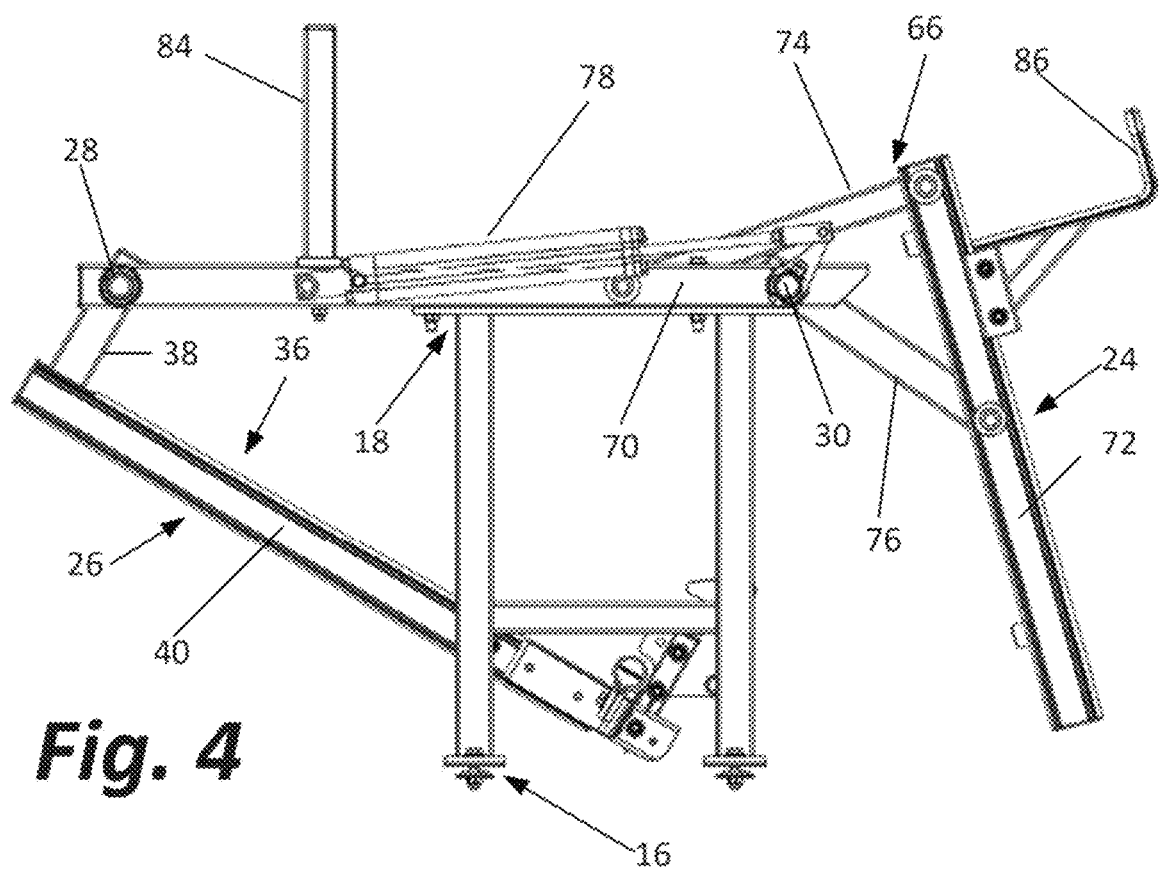
FIG. 4 is a side view of the ladder rack of FIG. 1 with the upper stage and the lower stage both in their loading/unloading position.
Figure 5:
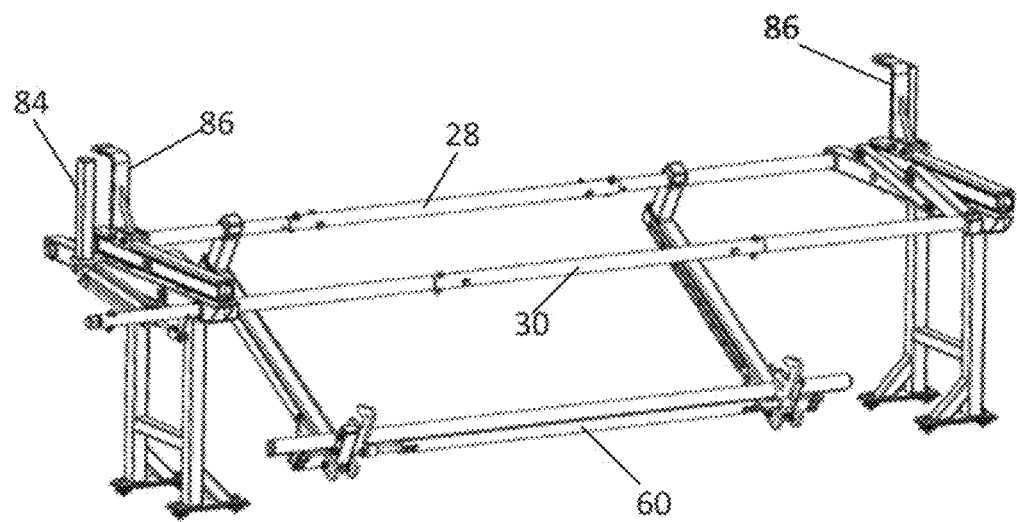
FIG. 5 is a perspective view of the ladder rack of FIG. 1 with the upper stage in its stowed position and the lower stage in its loading/unloading position.
Figure 6:
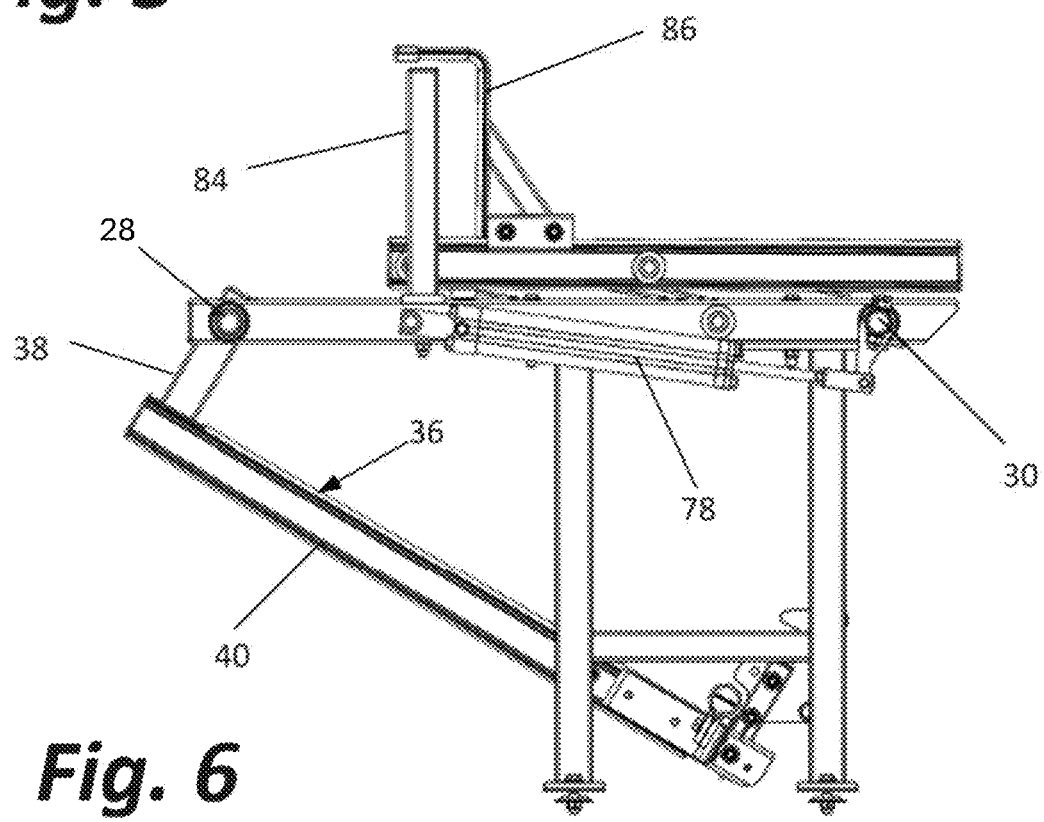
FIG. 6 is an end view of the ladder rack of FIG. 1 with the upper stage in its stowed position and the lower stage in its loading/unloading position.
Figure 7:
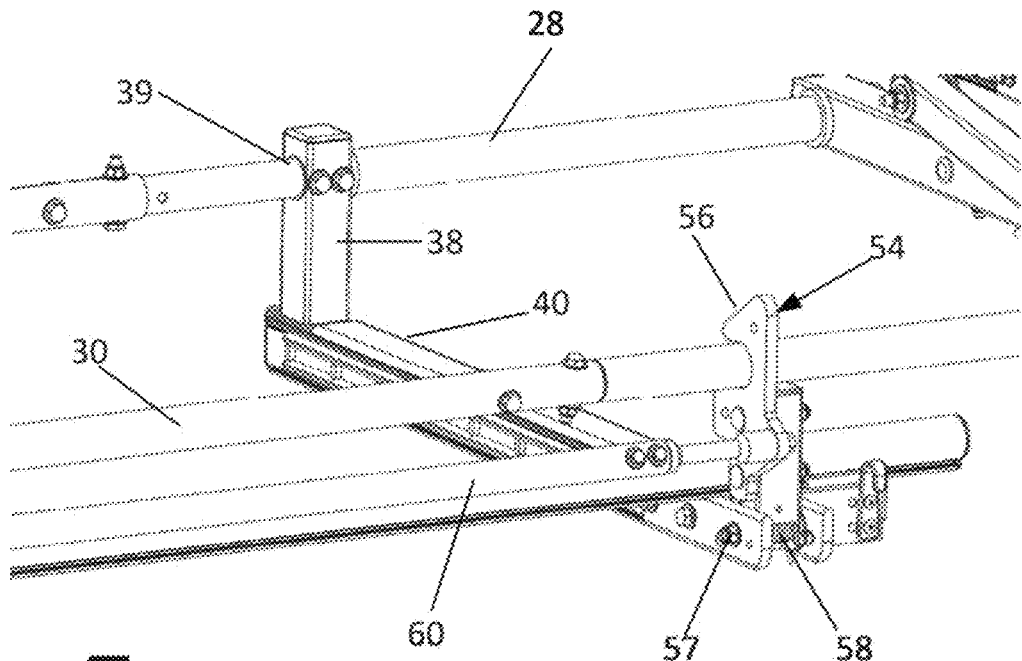
FIG. 7 is a detailed perspective view of a first lower stage support assembly of the ladder rack of FIG. 1.
Figure 8:
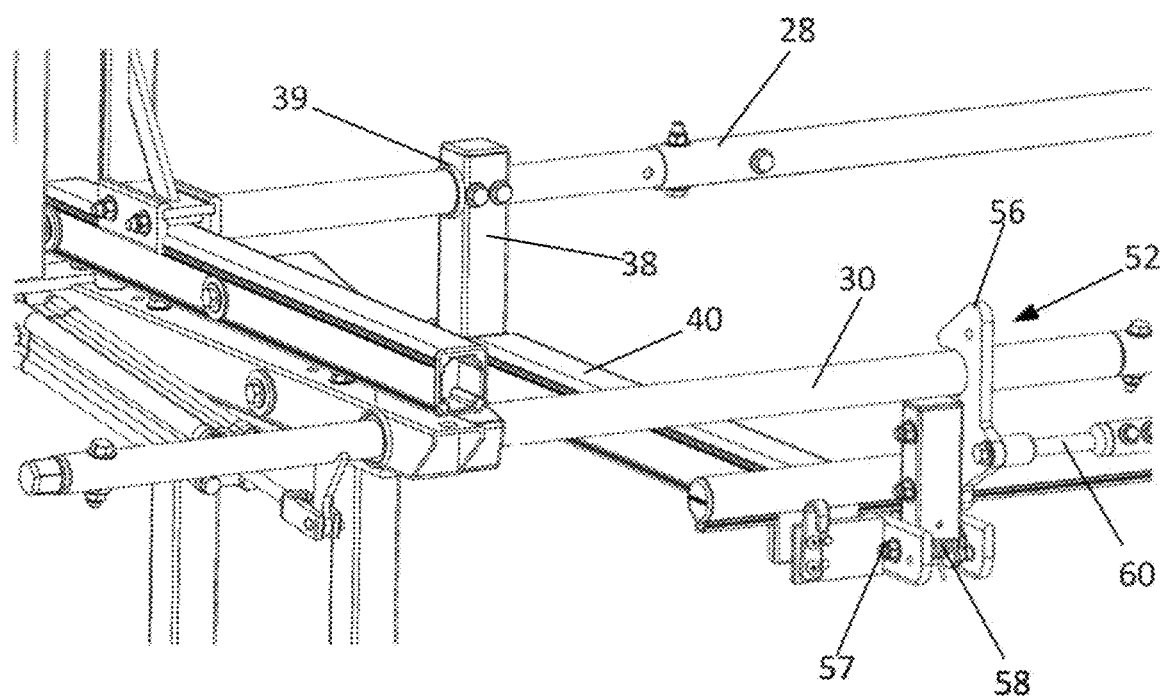
FIG. 8 is a detailed perspective view of a second lower stage support assembly of the ladder rack of FIG. 1.
Figure 9:
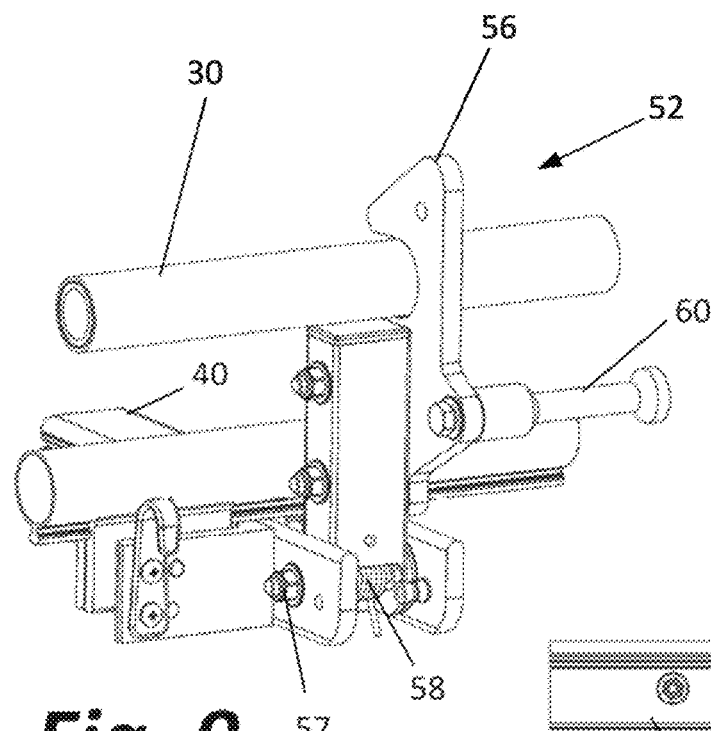
FIG. 9 is a detailed perspective view of a latch assembly of the lower stage of the ladder rack of FIG. 1 in its latched condition.
Figure 10:
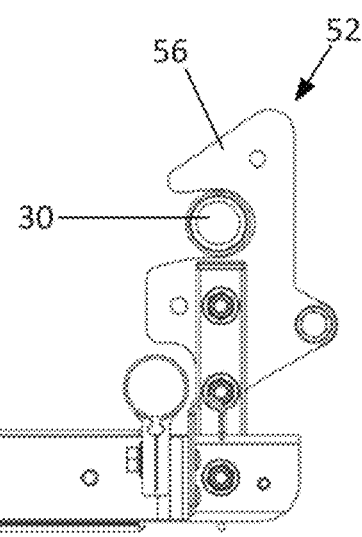
FIG. 10 is a detailed end view of a latch assembly of the lower stage of the ladder rack of FIG. 1 in its latched condition.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIGS. 1 through 6, a vehicle roof rack constructed in accordance with the present invention is indicated generally by numeral 10. The roof top ladder rack including a pair of stage supports 12 and 14. Each of the stage supports has bottom portion 16 adapted to be attached to the roof of a vehicle, a top portion 18, an inside portion 20 and an outside portion 22. This pair of stage supports 12/14 is used to support at least two vertically arranges stages and above a vehicle's roof. More specifically, and as shown in FIGS. 15 through 19, an upper stage 24 adapted to receive and hold at least one ladder, e.g., extension ladder 2, is coupled to the top portions 18 of the two stage supports 12/14 and a lower stage 26 is positioned between the roof of the vehicle and the upper stage 24. The lower stage 26 is adapted to receive and hold another ladder, e.g., step ladder 4. The upper stage 24 is adapted to move a ladder between a stowed position shown in FIGS. 13, 14, 15, 17 and 18 and a loading/unloading position shown in FIGS. 16 and 19. Likewise, the lower stage 26 is adapted to move a ladder between a stowed position shown in FIGS. 13, 14, 16, 17 and 18, and a loading/unloading position shown in FIGS. 16 and 18.

The lower stage 26 comprises a pivot bar 28 coupled to the inside portions 20 of the two stage supports 12/14 below the upper stage 24. The lower stage further comprises a latch bar 30 coupled to the outside portions 22 of the two stage supports 12/14 below the upper stage 24. Rotatable mounted to the pivot bar 28 are two lower stage support assemblies 32 and 34. Each of the two lower stage support assemblies 32/34 is adapted to rotate about the pivot bar 28 between the stowed position and the loading/unloading position.

Each stage support assembly 32/34 also includes an angled support member 36 having a shorter leg 38 coupled to the pivot bar 28 and a longer leg 40 adapted to support the second ladder. In some embodiments the shorter legs 38 are perpendicular to the longer legs 40 and the pivot bar 28 extends through openings 39 extending in (i.e., extending through) the shorter legs 38.

Figure 11:
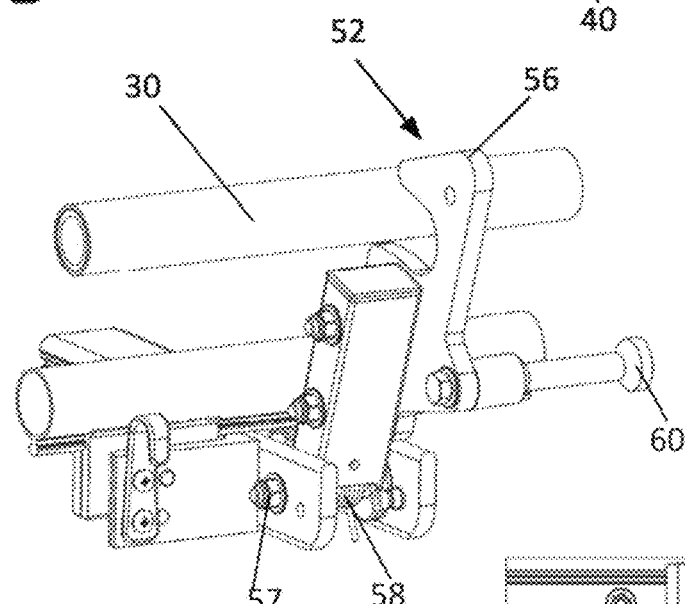
FIG. 11 is a detailed perspective view of a latch assembly of the lower stage of the ladder rack of FIG. 1 in its unlatched condition.
Figure 12:
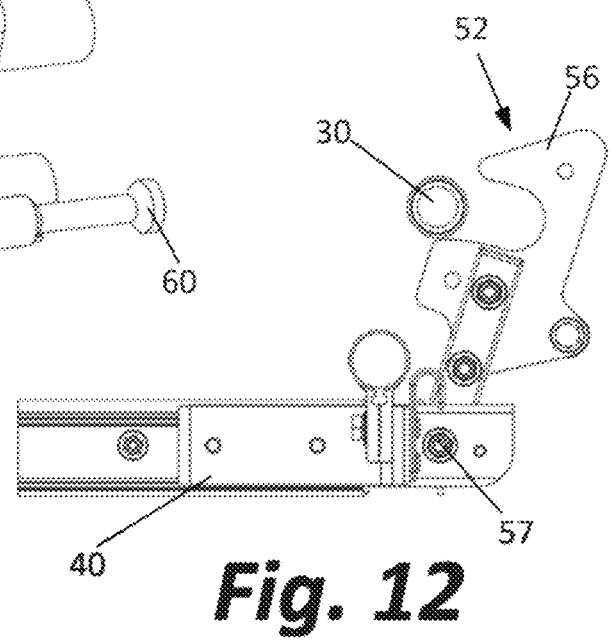
FIG. 12 is a detailed end view of a latch assembly of the lower stage of the ladder rack of FIG. 1 in its unlatched condition
Figure 13:
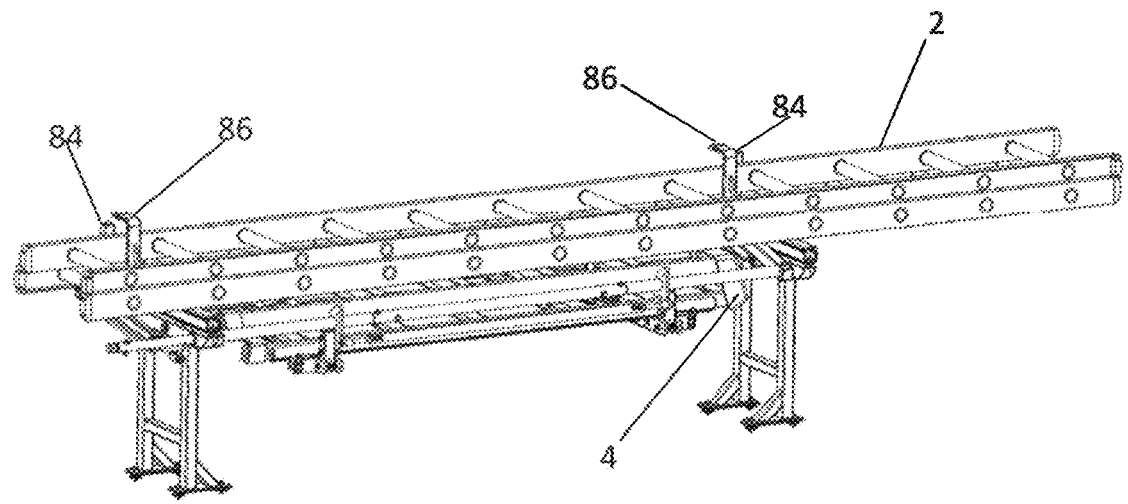
FIG. 13 is a perspective view of the ladder rack of FIG. 1 with an extension ladder stowed on the upper stage and a step ladder stowed on the lower stage.
Figure 14:
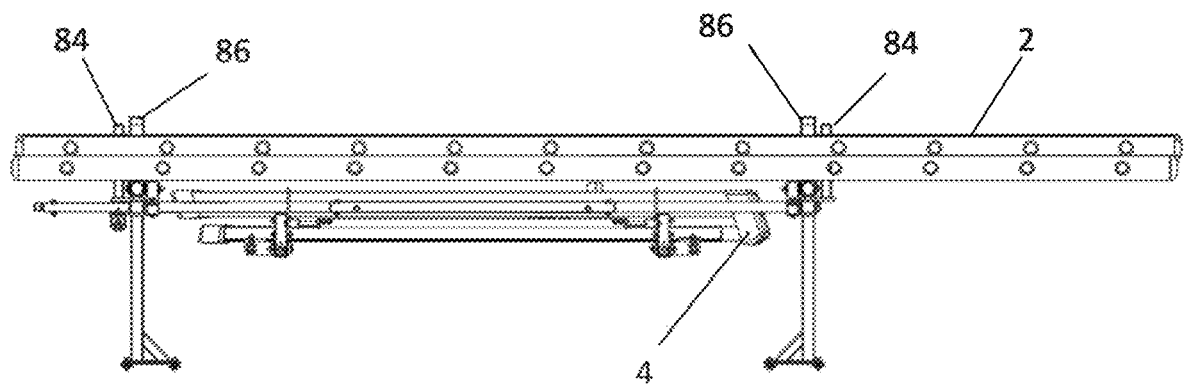
FIG. 14 is a side view of the ladder rack of FIG. 1 with an extension ladder stowed on the upper stage and a step ladder stowed on the lower stage.
Figure 15:
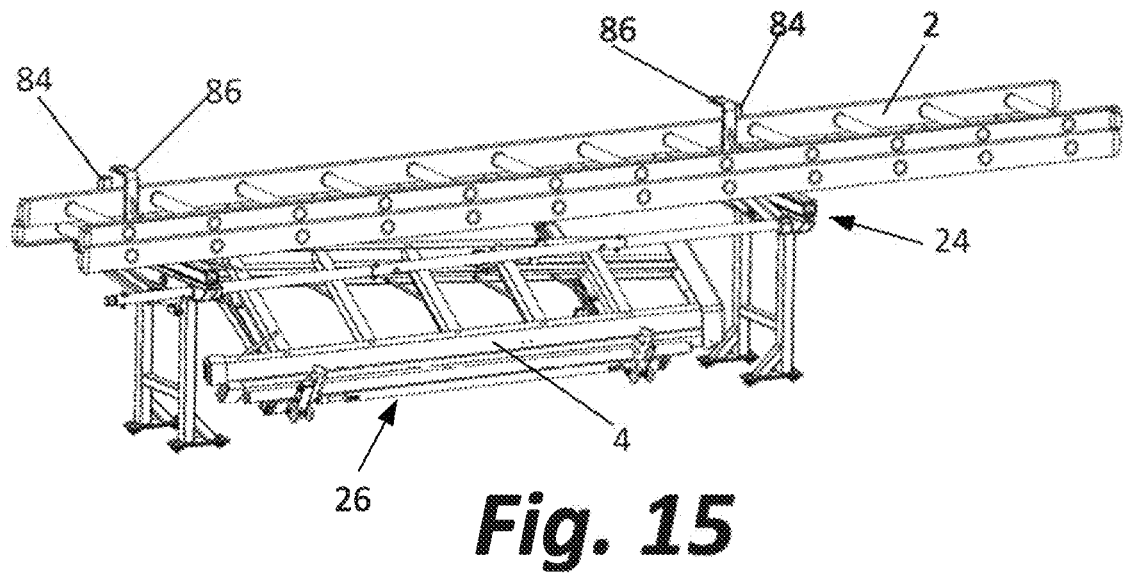
FIG. 15 is a perspective view of the ladder rack and ladders of FIG. 13 with the lower stage in its loading/unloading position and the upper stage in it stowed position.
Figure 16:
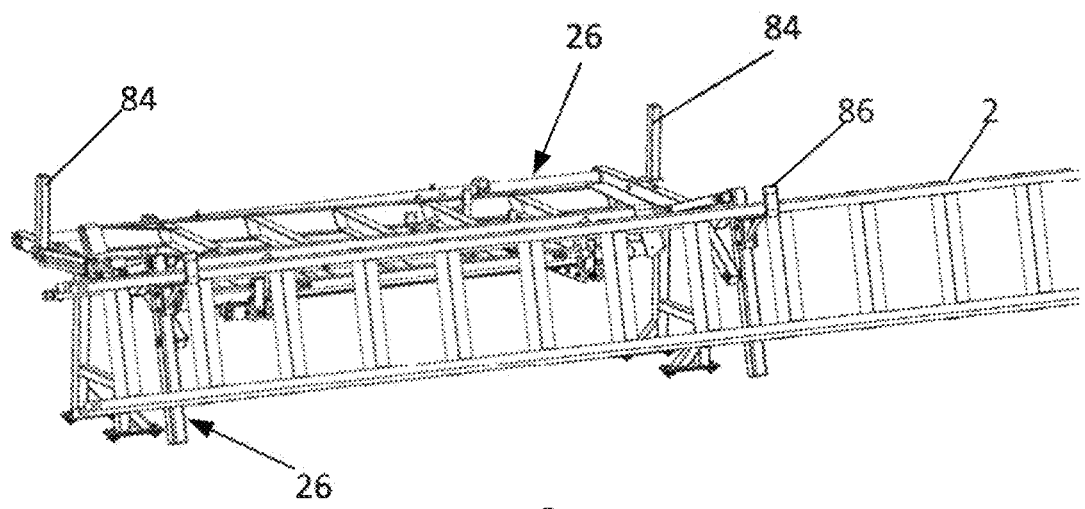
FIG. 16 is a perspective view of the ladder rack and ladders of FIG. 13 with the lower stage in its stowed position and the upper stage in its loading/unloading position.
Figure 17:
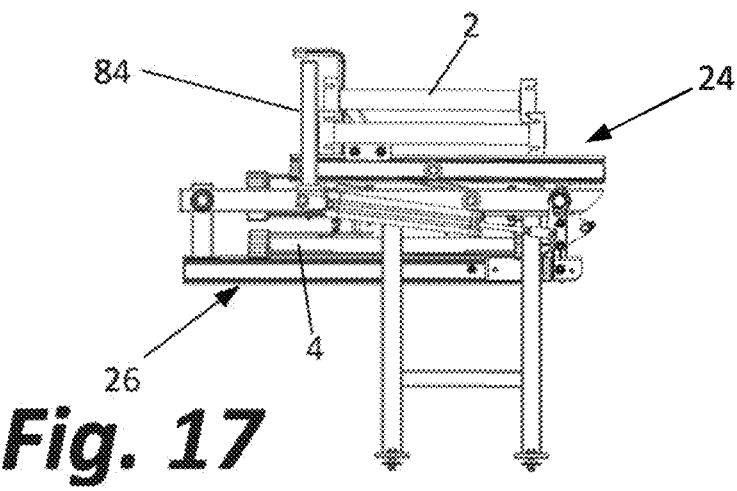
FIG. 17 is an end view of the ladder rack and ladders of FIG. 13 with an extension ladder stowed on the upper stage and a step ladder stowed on the lower stage.
Figure 18:
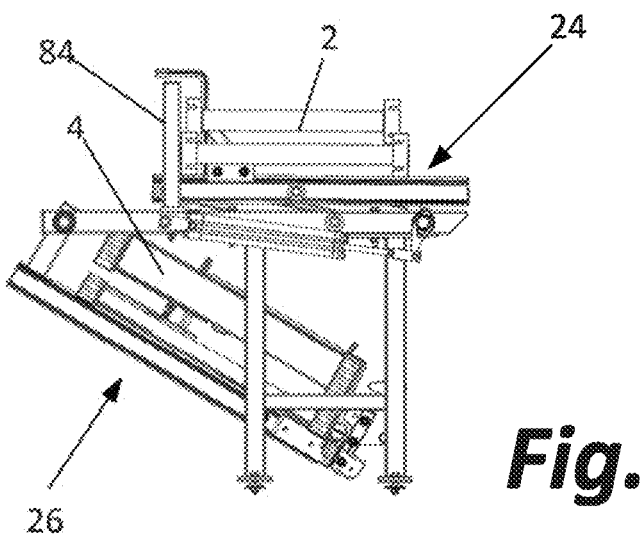
FIG. 18 is an end view of the ladder rack and ladders of FIG. 13 with the lower stage in its loading/unloading position and the upper stage in it stowed position.
Figure 19:
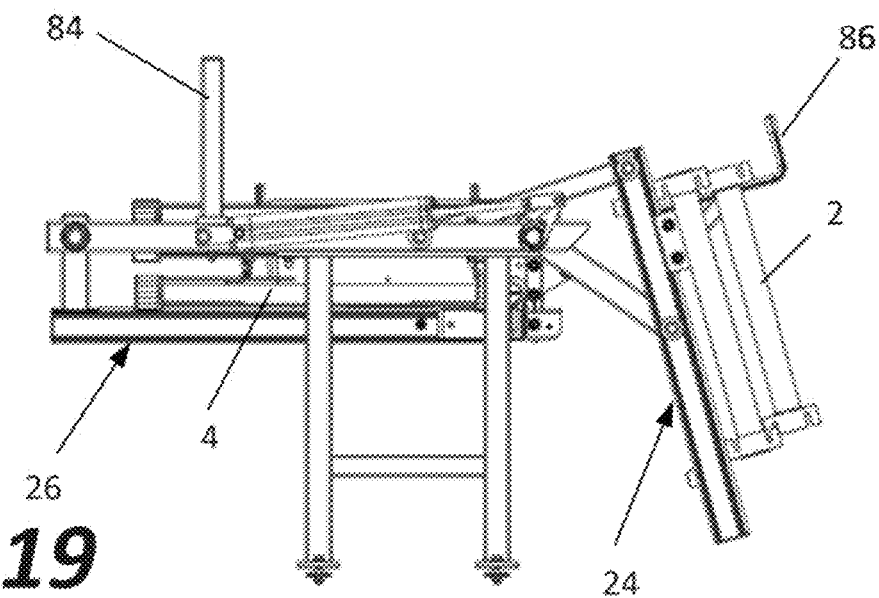
FIG. 19 is an end view of the ladder rack and ladders of FIG. 13 with the lower stage in its stowed position and the upper stage in its loading/unloading position.

A latch assembly 50 is provided to selectively lock the lower stage support assemblies 32/34 in the stowed position. In some embodiments, the latch assembly 50 comprises two latch subassemblies 52 and 54 coupled to the two longer legs 40 of the two angle support members 36 of the two lower stage support assemblies 32/34. Each latch subassembly 52/54 comprises a hook 56 adapted to rotate about an axle 57 and a biasing spring 58. These hooks 56 are adapted to move between a latched position shown in FIGS. 7 through 10 and an unlatched position shown in FIGS. 11 and 12. These hooks 56 and engage the latch bar 30 when the lower stage support assemblies 32/34 are in the stowed position and the hooks 56 are in the latched position. The biasing springs 58 bias the hooks 56 toward the latched position. The latch assembly further comprises a latch actuator handle 60 coupled to each of the hooks 56. The latch actuator handle 60 is used to retract the hooks 56 from the latched position to the unlatched position to disengage the hooks 56 from the latch bar 30 permitting the lower stage support assemblies 32/34 to be rotated together about the pivot 28 bar between the stowed position and the loading/unloading position.

The upper stage 24 can be fixed in place. Various mechanisms may also be used to move ladders onto and off the upper stage. Once such mechanism includes a first and a second 4-bar linkage assemblies 66/68, each including a stationary bar member 70 attached to the top portions 18 of the stage supports 12/14 in parallel, spaced-apart relation so as to extend transverse to the longitudinal axis of said motor vehicle. Each 4-bar linkage 66/68 also includes a movable bar member 72 comprising a ladder rest pivotally coupled to the stationary bar member 70 by a pair of rigid links 74/76 of unequal length. A shock absorber 78 may also be provided. This pair of rigid links 74/76 is sized and positioned such that rotation of one of said pair of rigid links 74/76 on each of the two 4-bar linkage assemblies 66/68 results in the movable bar members 72 comprising the ladder rests moving between the stowed disposition and the loading/unloading disposition. The stowed disposition is generally parallel to the roof of the vehicle and vertically arranged above the lower stage 26. The loading/unloading disposition is aligned with and spaced from one side of the vehicle. The latch bar 30 referenced above is of adjustable length and extends longitudinally between the two 4-bar linkage assemblies 66/68. More specifically, the latch bar 30 is journaled for rotation in the stationary bar member 70 of each of said 4-bar linkage assemblies 66/68 and operatively coupled to one of the pair of rigid links 74 in each of said 4-bar linkage assemblies 66/68. A means for rotating the latch bar 30 is also provided. One example is an elongate handle (not shown) coupled to one end 82 to the latch bar 30. Another example is a small electric motor (not shown) coupled to one end 82 to the latch bar 30. Rotation of the latch bar 30 actuates the two 4-bar linkage assemblies 66/68 to move the ladder rest between a "stowed" disposition shown in FIGS. 1, 2, 5, 6, 13-15, 17 and 18, and second loading/unloading disposition shown in FIGS. 3, 4, 16 and 19.

Extending upwardly from each of the stationary bar members 70 is a ladder stop 84 and extending upwardly from the movable bar member 72 is a right angle ladder retaining member 86. The retaining members 86 cooperate with the ladder stop 84 to prevent an extension ladder from sliding or bouncing off upper stage of the ladder rack as the truck travels along a road. The component of the lower stage, upper stage and stage supports prevent a ladder stowed on the lower stage from sliding or bouncing off the lower stage. However, for additional security and to accommodate ladders of shorter lengths, hooks such as 88 are provided which can be employed with straps or bungee cords (not shown) to secure such a ladder to the lower stage.

This invention has been described herein in considerable detail to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A roof top ladder rack for work vehicles comprising:
    first stage and second stage supports, each having a bottom portion adapted to be attached to a roof of a vehicle, a top portion, an inside portion and an outside portion;
    an upper stage coupled to the top portions of the first and second stage supports, said upper stage adapted to support a first ladder in an upper stage stowed position above the roof of the vehicle; and
    a lower stage adapted to move between a lower stage stowed position and a lower stage loading/unloading position, said lower stage comprising:
        a pivot bar extending between and coupled to the first and second stage supports;
        a latch bar extending between and coupled to the first and second stage supports;
        first and second angled support members each coupled to the pivot bar and adapted to support a second ladder; and
        a latch assembly adapted to selectively lock the lower stage in the lower stage stowed position;
    wherein when the first ladder is supported on the upper stage and the upper stage is positioned in the upper stage stowed position, and the second ladder is supported on the lower stage and the lower stage is positioned in the lower stage loading/unloading position, the second ladder is removable from the lower stage without removing the first ladder from the upper stage.

2. The roof top ladder rack of claim 1 wherein the first and second angled support members each comprise a shorter leg that is perpendicular to a longer leg.

3. The roof top ladder rack of claim 2 wherein the shorter legs each have an opening with the pivot bar extending through the opening.

4. The roof top ladder rack of claim 1 wherein the latch assembly comprises at least one hook and at least one biasing spring, said at least one hook adapted to be moved between a latched position and an unlatched position.

5. The roof top ladder rack of claim 4 wherein at least one hook is adapted to engage the latch bar when the lower stage is in the lower stage stowed position and the at least one hook is in the latched position.

6. The roof top ladder rack of claim 5 wherein said at least one biasing spring is adapted to bias the at least one hook toward the latched position.

7. The roof top ladder rack of claim 1 wherein the latch assembly comprises a first and second hooks, said first and second hooks each adapted to be moved between a latched position and an unlatched position.

8. The roof top ladder rack of claim 7 further comprising a first and second biasing springs adapted to bias said first and second hooks toward their latched position.

9. The roof top ladder rack of claim 7 wherein the first hook is rotatably coupled to the first angled support member and the second hook is rotatably coupled to the second angled support member.

10. The roof top carrier of claim 7 having a latch actuator handle extending between and coupled to the first hook and second hook.

11. The roof top carrier of claim 1 wherein the latch assembly comprises a first latch subassembly coupled to the first angled support member and including a first hook and a first biasing spring, said first hook adapted to be moved between a latched position and unlatched position and engage the latch bar when the lower stage is in the lower stage stowed position and the first hook is in the latched position, and said first spring adapted to bias the hook toward the latched position; wherein the latch assembly further comprises a second latch subassembly coupled to the second angled support member and including a second hook and a second biasing spring, said second hook adapted to be moved between a latched position and unlatched position and engage the latch bar when the lower stage is in the lower stage stowed position and the second hook is in the latched position, and said second spring adapted to bias the second hook toward the latched position; and wherein the latch assembly further comprises a latch actuator handle coupled to the first hook and second hook and adapted to disengage the first hook and second hook from the latch bar permitting the lower stage to pivot about the pivot bar between the lower stage stowed position and the lower stage loading/unloading position.

12. The roof top carrier of claim 1 wherein the upper stage is movable between an upper stage stowed position and an upper stage loading/unloading position.

13. The roof top carrier of claim 1 wherein the upper stage comprises (i) first and a second 4-bar linkage assemblies, each including a stationary bar, and a movable bar comprising a ladder rest pivotally coupled to said stationary bar member by a pair of rigid links.

14. The roof top carrier of claim 13 wherein the latch bar extends between said first and second 4-bar linkage assemblies, is journaled for rotation in said stationary bar member of each of said 4-bar linkage assemblies and is operatively coupled to one of said pair of rigid links of each of said 4-bar linkage assemblies.

15. The roof top carrier of claim 14 further comprising means for rotating said latch bar and thereby moving the upper stage between the upper stage stowed position and the upper stage loading/unloading position.

16. A roof top ladder rack comprising:
   first and second stage supports, each having a bottom portion adapted to be attached to a roof of a vehicle, a top portion, an inside portion and an outside portion;
   an upper stage adapted to support a first ladder and coupled to the top portions of the first and second stage supports, said upper stage adapted to move between an upper stage stowed position above the roof of the vehicle and an upper stage loading/unloading position adjacent a side of the vehicle; and
   a lower stage adapted to move between a lower stage stowed position and a lower stage loading/unloading position, said lower stage comprising:
      a pivot bar extending between and coupled to the first and second stage supports;
      a latch bar extending between and coupled to the first and second stage supports;
      first and second support members pivotally coupled to the pivot bar and adapted to support a second ladder; and
      a latch assembly adapted to selectively lock the lower stage in the lower stage stowed position;
   wherein when the first ladder is supported on the upper stage and the upper stage is positioned in the upper stage stowed position, and the second ladder is supported on the lower stage and the lower stage is positioned in the lower stage loading/unloading position, the second ladder is removable from the lower stage without removing the first ladder from the upper stage.

17. The roof top ladder rack of claim 16 wherein the upper stage comprises first and second 4-bar linkages each including a stationary bar, and a movable bar comprising a ladder rest pivotally coupled to said stationary bar by a pair of rigid links.

18. The roof top ladder rack of claim 16 wherein the latch bar is coupled to each of the first and second 4-bar linkages and rotation of the latch bar causes the upper stage to move between the upper stage stowed position above the roof of the vehicle and the upper stage loading/unloading position adjacent a side of the vehicle.

19. The roof top ladder rack of claim 17 further comprising ladder stops extending upwardly from the stationary bars of the first and second 4-bar linkages, and ladder retaining members extending from the movable bars of the first and second 4-bar linkages.

20. The roof top ladder rack of claim 16 wherein said latch assembly comprises at least one hook adapted to engage the latch bar when the lower stage is in the lower stage stowed position and the at least one hook is in the latched position.

* * * * *